US012338968B2

(12) United States Patent
Sasena et al.

(10) Patent No.: US 12,338,968 B2
(45) Date of Patent: Jun. 24, 2025

(54) VEHICLE SIGNAL LIGHTING ASSEMBLY

(71) Applicant: Autosystems, a division of Magna Exteriors Inc., Aurora (CA)

(72) Inventors: Jeremy R. Sasena, Canton, MI (US); Yasen I. Yakimov, Berlin (DE)

(73) Assignee: Autosystems, a division of Magna Exteriors Inc., Aurora (CA)

(*) Notice: Subject to any disclaimer, the term of this patent is extended or adjusted under 35 U.S.C. 154(b) by 0 days.

(21) Appl. No.: 18/391,058

(22) Filed: Dec. 20, 2023

(65) Prior Publication Data

US 2024/0230052 A1 Jul. 11, 2024

Related U.S. Application Data

(60) Provisional application No. 63/437,481, filed on Jan. 6, 2023.

(51) Int. Cl.

| | |
|---|---|
| ***F21S 43/14*** | (2018.01) |
| ***F21S 43/237*** | (2018.01) |
| ***F21S 43/241*** | (2018.01) |
| ***F21S 43/31*** | (2018.01) |
| *F21W 103/20* | (2018.01) |
| *F21W 103/35* | (2018.01) |
| *F21W 103/45* | (2018.01) |
| *F21W 107/10* | (2018.01) |
| *F21Y 115/10* | (2016.01) |

(52) U.S. Cl.

CPC ............. *F21S 43/14* (2018.01); *F21S 43/237* (2018.01); *F21S 43/241* (2018.01); *F21S 43/31* (2018.01); *F21W 2103/20* (2018.01); *F21W 2103/35* (2018.01); *F21W 2103/45* (2018.01); *F21W 2107/10* (2018.01); *F21Y 2115/10* (2016.08)

(58) Field of Classification Search

CPC ....... F21S 43/237; F21S 43/241; F21S 43/402

See application file for complete search history.

(56) References Cited

U.S. PATENT DOCUMENTS

| | | | | |
|---|---|---|---|---|
| 10,895,361 B1* | 1/2021 | Crespin | B60Q 1/2607 | |
| 2003/0193815 A1* | 10/2003 | Mishimagi | B60Q 1/2665 | 362/494 |
| 2014/0247616 A1* | 9/2014 | Arrivet | F21S 43/251 | 362/511 |
| 2014/0376245 A1* | 12/2014 | Ritter | F21S 43/239 | 362/511 |
| 2016/0356446 A1* | 12/2016 | Okada | F21S 43/241 | |
| 2016/0369967 A1* | 12/2016 | Nakada | G02B 6/0075 | |
| 2018/0306399 A1* | 10/2018 | Rabek | F21S 43/40 | |
| 2019/0154228 A1* | 5/2019 | Xiang | F21S 43/15 | |

* cited by examiner

*Primary Examiner* — Eric T Eide

(74) *Attorney, Agent, or Firm* — Dickinson Wright PLLC

(57) ABSTRACT

A tail light assembly for a vehicle includes a stop/turn lighting element that includes an output lens having a first region and a second region having an elongated shape. The stop/turn lighting element also includes a first illuminator portion configured to direct light from a first light source out of the first region of the output lens. The stop/turn lighting element also includes a second illuminator portion including an input element disposed along the second region of the output lens and a light pipe having an elongated shape extending parallel to and spaced apart from the input element. The second illuminator portion is configured to direct light from a second light source out of the second region of the output lens.

18 Claims, 8 Drawing Sheets

VEHICLE SIGNAL LIGHTING ASSEMBLY

This U.S. utility patent application claims the benefit of U.S. Provisional Patent Application No. 63/437,481 filed Jan. 6, 2023, the contents of which is incorporated herein by reference in its entirety.

FIELD

The present disclosure relates generally to lighting for motor vehicles. More specifically, the present disclosure relates to signal lights for passenger vehicles, such as cars and trucks.

BACKGROUND

It is known to employ semiconductor light sources, in particular light emitting diodes (LEDs), in automotive signal lights. For example, tail lights on some vehicles include an array of red light-emitting and/or amber light-emitting LEDs which are positioned between a reflector and a lens to provide the desired signal patterns. It is also known to have signal lamps wherein one or more LEDs are arranged in a direct view wherein the output of the LED passes directly through the lens of the signal light.

While known signal lights employing LEDs provide advantages over signal lights employing incandescent bulbs, they still suffer from some problems. For example, available LEDs emit limited amounts of light relative to incandescent lamps. Due to these lower emitted levels of light and/or the inefficiency of a conventional reflector and lens in transmitting the light produced by the LEDs, a large number of LEDs must often be employed to produce sufficient signal lighting to meet regulatory requirements. Further, this large number of LEDs must be appropriately spaced about the signal light to provide the lighted surface area required to meet regulatory requirements and thus the aesthetic design of such signal lights is limited.

As will be apparent, next to regulatory and safety concerns, aesthetic design can be one of the most significant considerations for the designer of a vehicle and, to date, the range of aesthetic design available for signal lamps using semiconductor light sources has been limited. For example, conventional vehicle LED lighting solutions may not be able to provide a uniform appearance across a wide angle, such as for a lighting effect that wraps around a corner, and which also emits high intensity light in a particular direction.

SUMMARY

The present disclosure provides a lighting element for a vehicle. The lighting element includes an output lens having a first region and a second region having an elongated shape. The lighting element also includes a first illuminator portion configured to direct light from a first light source out of the first region of the output lens. The lighting element also includes a second illuminator portion including an input element disposed along the second region of the output lens and a light pipe having an elongated shape extending parallel to and spaced apart from the input element. The second illuminator portion is configured to direct light from a second light source out of the second region of the output lens.

In some embodiments, the first illuminator portion and the second illuminator portion are formed from a single molded piece.

In some embodiments, the first light source includes a plurality of first LEDs, and wherein the second light source includes one or more second LEDs.

In some embodiments, the first LEDs generate light in a direction perpendicular or parallel to the output lens.

In some embodiments, the one or more second LEDs generate light in a direction perpendicular to the output lens.

In some embodiments, the one or more second LEDs generate light in a direction perpendicular or parallel to the light pipe.

In some embodiments, the one or more second LEDs generate light in a direction parallel to the output lens.

In some embodiments, the output lens defines a continuous outer surface including each of the first region and the second region.

In some embodiments, the output lens defines an outside corner, with the first region and the second region together wrapping-around at least about a 90-degree angle.

In some embodiments, the light pipe has an elongated shape with a circular or semicircular cross-section.

In some embodiments, the light pipe further includes a reflector extending along a side thereof opposite from the input element.

The present disclosure also provides a tail light assembly for a vehicle. The tail light assembly includes a stop/turn lighting element that includes an output lens having a first region and a second region having an elongated shape. The stop/turn lighting element also includes a first illuminator portion configured to direct light from a first light source out of the first region of the output lens. The stop/turn lighting element also includes a second illuminator portion including an input element disposed along the second region of the output lens and a light pipe having an elongated shape extending parallel to and spaced apart from the input element. The second illuminator portion is configured to direct light from a second light source out of the second region of the output lens.

In some embodiments, the first illuminator portion and the second illuminator portion are formed from a single molded piece.

In some embodiments, the first light source includes a plurality of first LEDs, and wherein the second light source includes one or more second LEDs.

In some embodiments, the first LEDs generate light in a direction perpendicular to the output lens.

In some embodiments, the one or more second LEDs generate light in a direction perpendicular to the output lens.

In some embodiments, the one or more second LEDs generate light in a direction perpendicular or parallel to the light pipe.

In some embodiments, the output lens defines a continuous outer surface including each of the first region and the second region.

In some embodiments, the output lens defines an outside corner, with the first region and the second region together wrapping-around at least about a 90-degree angle.

In some embodiments, the light pipe has an elongated shape with a circular or semicircular cross-section.

In some embodiments, the light pipe further includes a reflector extending along a side thereof opposite from the input element.

BRIEF DESCRIPTION OF THE DRAWINGS

Further details, features and advantages of designs of the invention result from the following description of embodiment examples in reference to the associated drawings.

DETAILED DESCRIPTION

Figure 1:
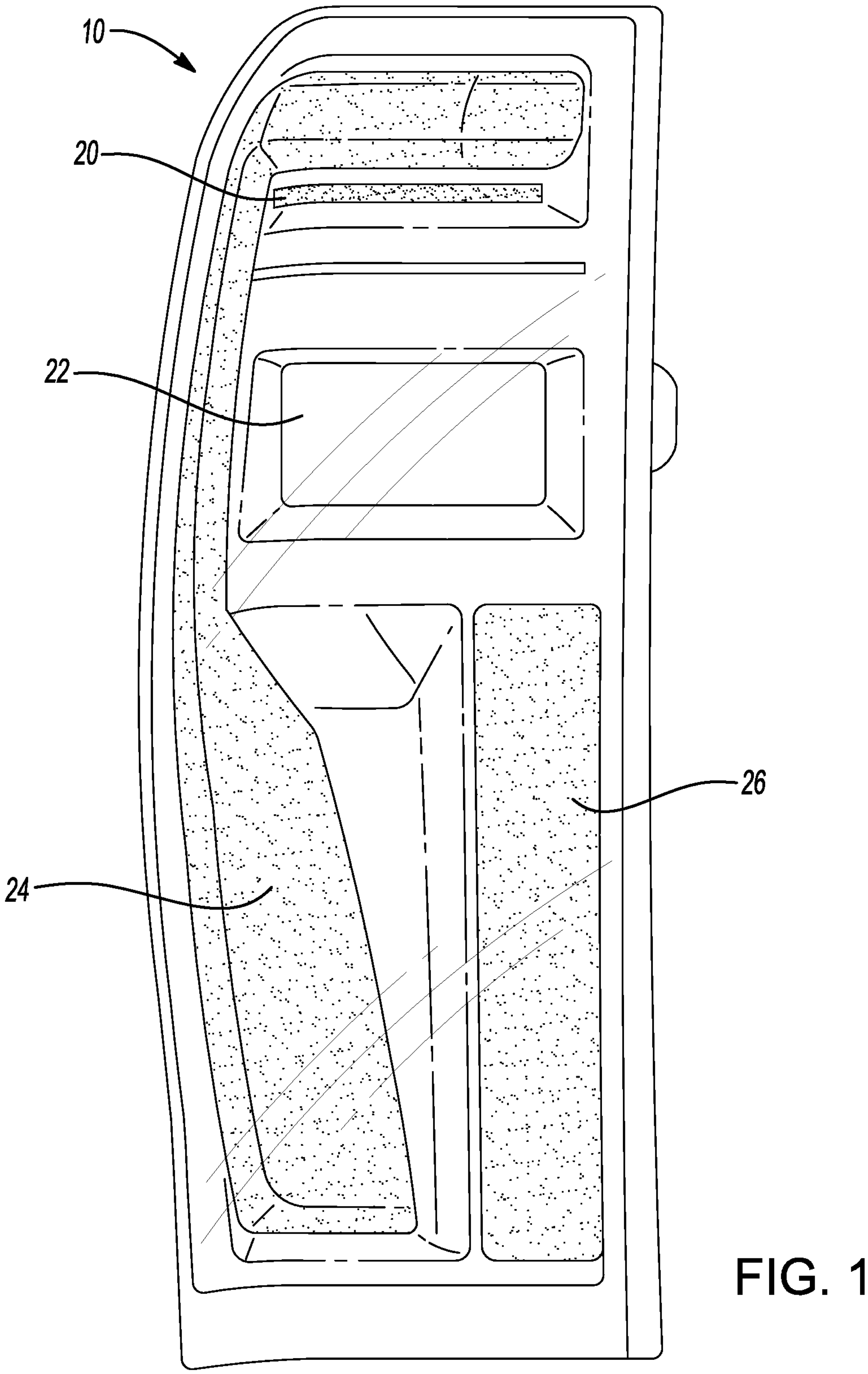
FIG. 1 shows a rear view of a tail light assembly for a vehicle, in accordance with an aspect of the present disclosure.

Referring to the drawings, the present invention will be described in detail in view of following embodiments.

FIG. 1 shows a tail light assembly 10 for a vehicle, such as a passenger car or truck. The tail light assembly 10 may be mounted on a rear corner of the vehicle and may provide illumination behind and to a corresponding side of the vehicle. The principles of the present disclosure may be applied to other vehicle lighting devices, such as a turn signal light mounted on a front corner of the vehicle.

As shown in FIG. 1, the tail light assembly 10 includes a stop/turn lighting assembly includes several lighting elements 20, 22, 24, 26 that may provide different visual effects and/or which may be used for different functions. The lighting elements 20, 22, 24, 26 include a stop/turn lighting element 20 that is configured to illuminate brightly to indicate a braking (i.e. stop) or a turn signal. The stop/turn lighting element 20 may be configured to provide a high-intensity solid red light to indicate the brakes being activated. The stop/turn lighting element 20 may be configured to provide a blinking high-intensity red light to indicate activation of a corresponding turn signal indicator.

The lighting elements 20, 22, 24, 26 also includes a reverse light 22 that may illuminate with a different color, such as white, to indicate that the vehicle is in reverse gear. The lighting elements 20, 22, 24, 26 also include a first running light 24 and a second running light 26. The running lights 24, 26 may present a low-intensity red light that is on whenever the vehicle is running or in response to a given set of conditions, such as when the headlights are on or when a low ambient light condition is detected. The running lights 24, 26 may be larger than the stop/turn lighting element 20. The lighting elements 20, 22, 24, 26, including the particular shape and placement thereof, may contribute to a decorative design of the tail light assembly 10. The tail light assembly 10, and its particular decorative design, may contribute to a unique styling of the vehicle, which may indicate a particular brand and/or trim level of the vehicle.

Figure 2:
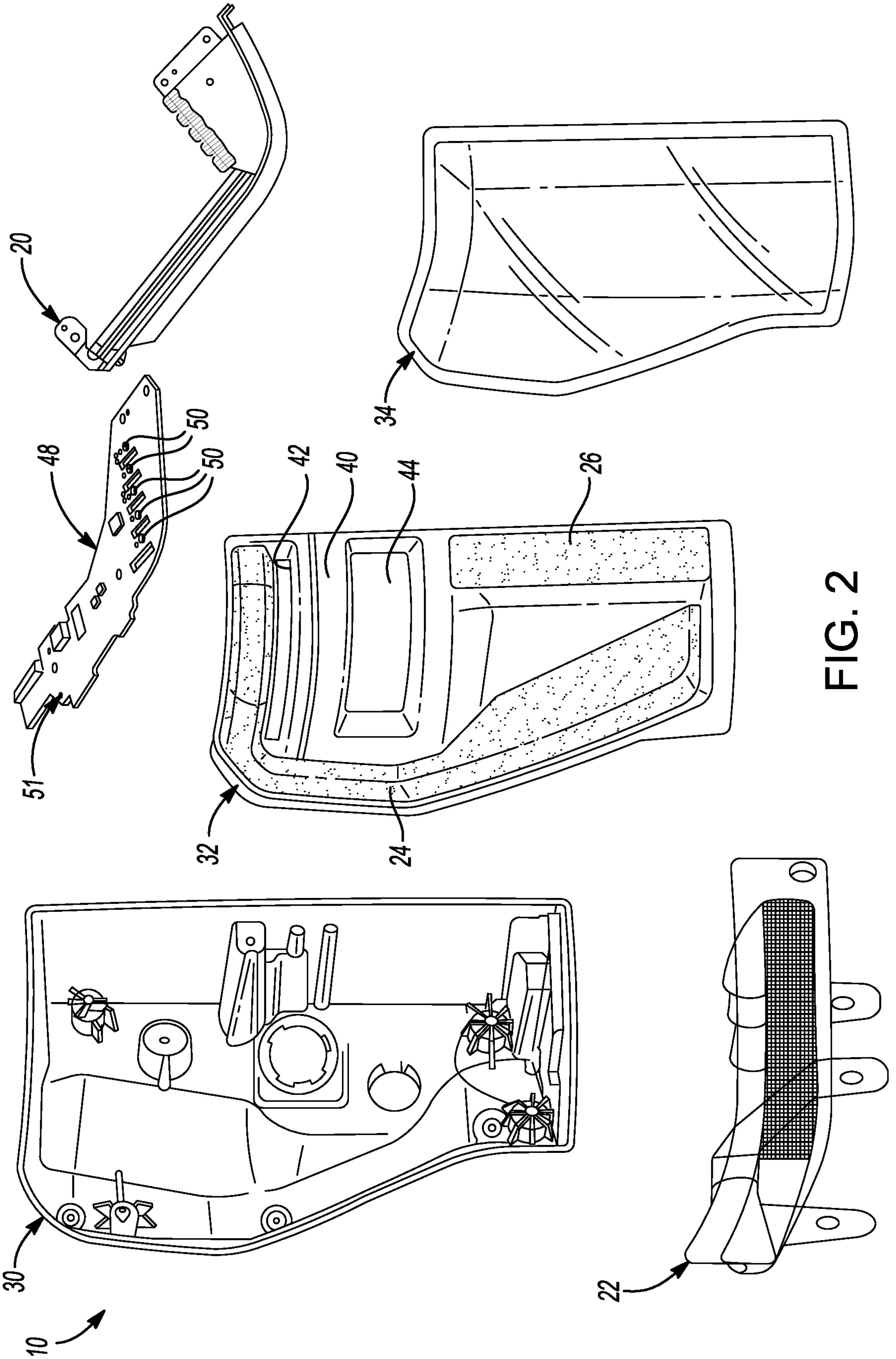
FIG. 2 shows an exploded view of the tail light assembly of FIG. 1.

FIG. 2 shows an exploded view of the tail light assembly 10. As shown in FIG. 2, the tail light assembly 10 incudes a rear housing 30, which may be made of molded material, such as plastic, and which is configured to attach to corresponding mounting structures on the vehicle and to provide mounting hardware for attachment of other components, including lighting devices. The tail light assembly 10 also includes a light body 32 having an internal plate 40 that holds the running lights 24, 26. The internal plate 40 also defines a first aperture 42 and a second aperture 44 for holding the stop/turn lighting element 20 and the reverse light 22, respectively. The tail light assembly 10 also includes an outer lens 34 configured to overlie the light body 32 and which is made of transparent or tinted material, such as plastic, so the lighting elements 20, 22, 24, 26 can be seen therethrough. The tail light assembly 10 also includes a printed circuit board (PCB) 48 configured to attach to the stop/turn lighting element 20 and which includes a plurality of light emitting diodes (LEDs) 50,51 disposed on a top surface of the PCB 48 for illuminating the stop/turn lighting element 20.

Figure 3:
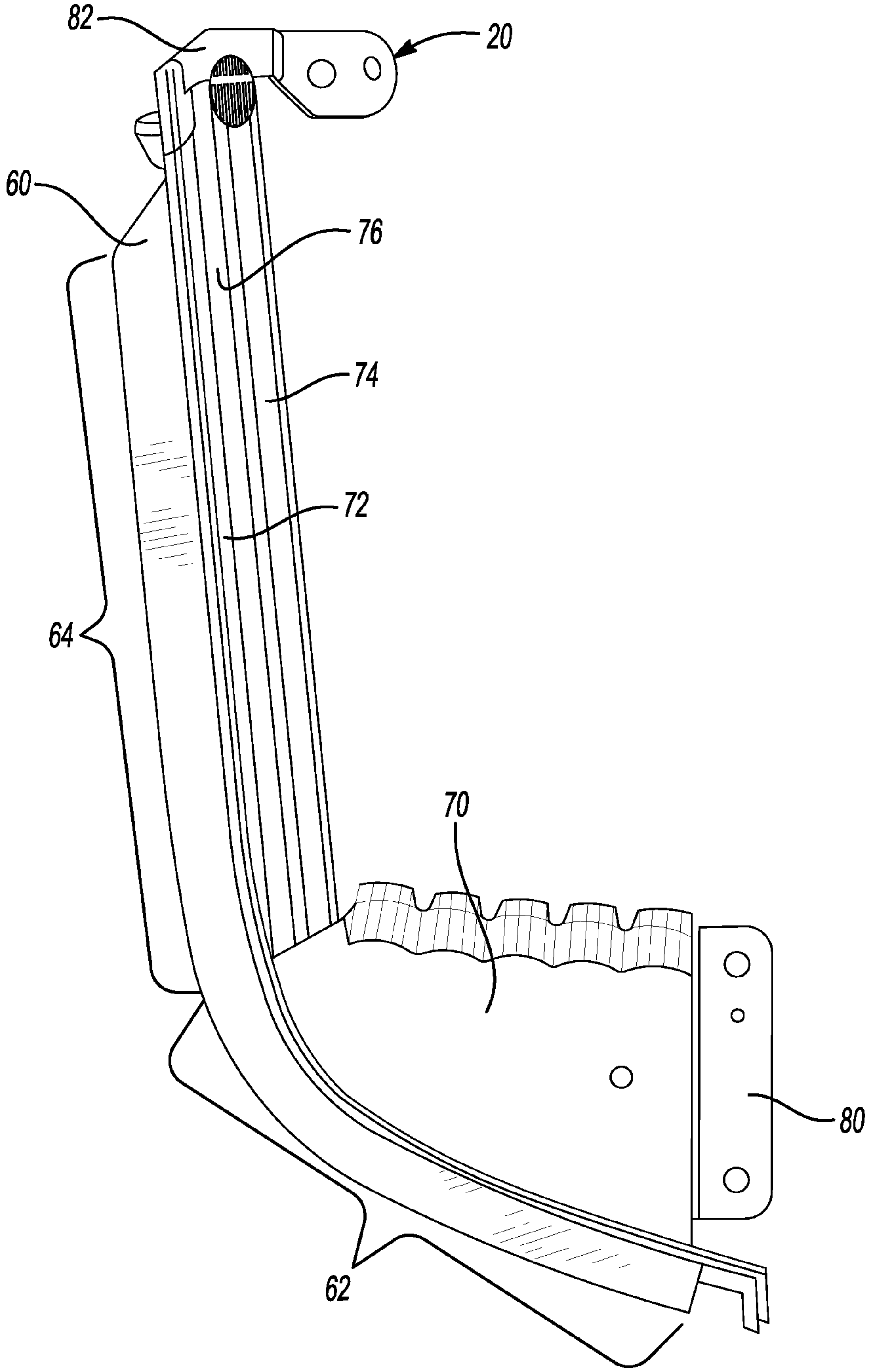
FIG. 3 shows a top view of a stop/turn lighting element of the tail light assembly of FIG. 1, in accordance with an aspect of the present disclosure.

FIG. 3 shows a top view of the stop/turn lighting element 20. As shown in FIG. 3, the stop/turn lighting element 20 includes an output lens 60 having an arcuate shape with a first region 62 and a second region 64 having an elongated shape. The output lens 60 may protrude through the first aperture 42 of the internal plate 40. The first region 62 may face generally rearward to be visible from a perspective behind the vehicle in which the tail light assembly 10 is mounted. The second region 64 may face generally sideward to be visible from a side of the vehicle in which the tail light assembly 10 is mounted. The first region 62 and the second region 64 of the output lens 60 may define a continuous curvature to provide continuous illumination around an outside corner, which may be about 90-degrees.

The stop/turn lighting element 20 includes a first illuminator portion 70, which may be called a blade, configured to direct light from a plurality of first LEDs 50 out of the first region 62 of the output lens 60. The stop/turn lighting element 20 also includes a second illuminator portion 72, 74 configured to direct light from one or more second LEDs 51 out of the second region 64 of the output lens 60. The second illuminator portion 72, 74 includes an input element 72 disposed in a straight line within the second region 64 of the output lens 60, and along a back surface thereof. The second illuminator portion 72, 74 also includes a light pipe 74 having an elongated shape with a circular cross-section extending parallel to and spaced apart from the input element 72. Alternatively, the light pipe 74 may have an elongated shape with a semicircular cross-section extending parallel to and spaced apart from the input element 72. The light pipe 74 may also be called an elongated light guide. The second illuminator portion 72, 74 defines an air gap 76 between the input element 72 and the light pipe 74, and which has a consistent width along a length of the light pipe 74.

The stop/turn lighting element 20 also includes a first mounting flange 80 located adjacent to an end of the output lens 60 opposite from the first illuminator portion 70. The first mounting flange 80 holds an end of the light pipe 74. The stop/turn lighting element 20 also includes a second mounting flange 82 located along a side of the first illuminator portion 70.

In some embodiments, the entire stop/turn lighting element 20, including both the first illuminator portion 70 and the second illuminator portion 72, 74 are formed from a single molded piece.

Figure 4:
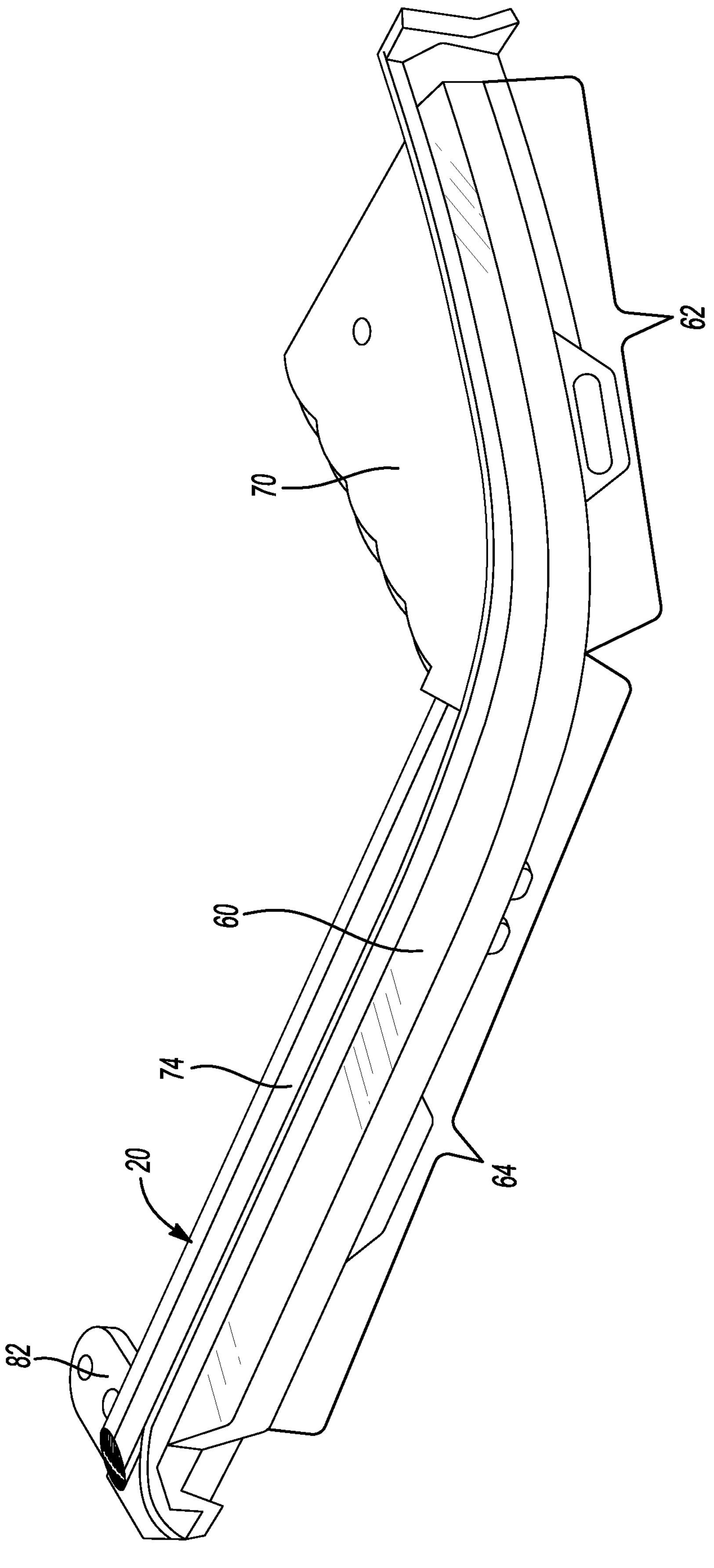
FIG. 4 shows a perspective view of the stop/turn lighting element of FIG. 3.
Figure 5:
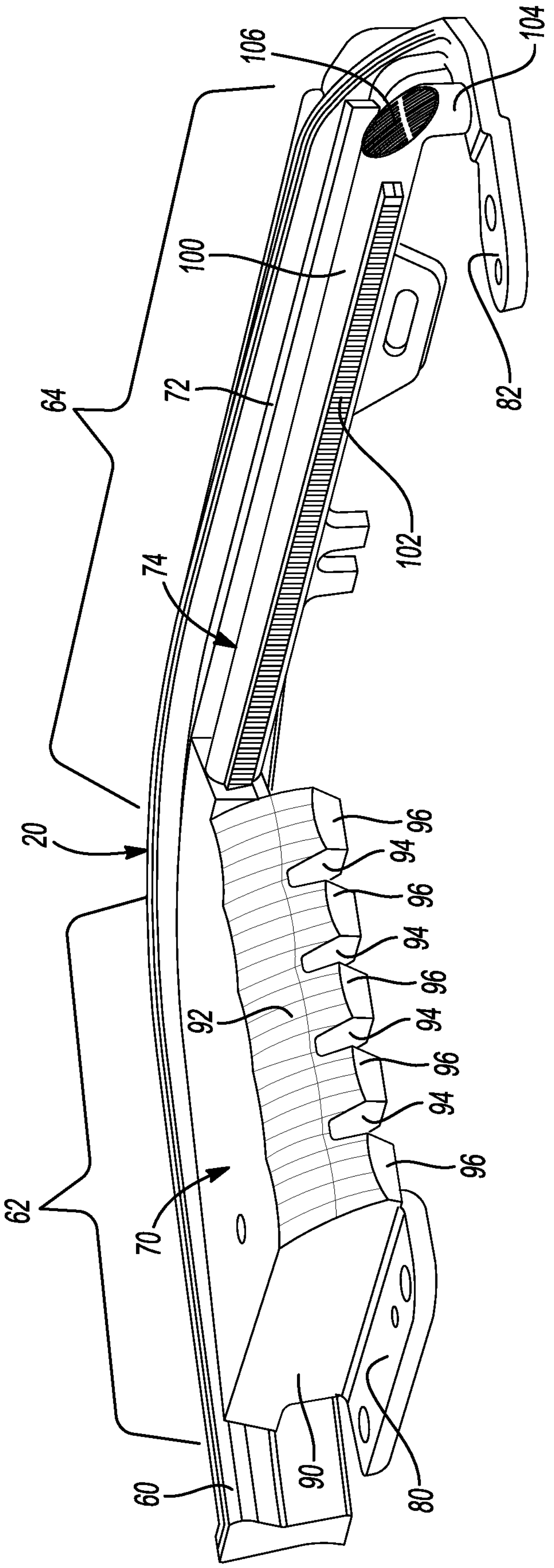
FIG. 5 shows another perspective view of the stop/turn lighting element of FIG. 3.

FIGS. 4-5 each perspective views of the stop/turn lighting element 20. As shown in FIG. 5, the first illuminator portion 70 of stop/turn lighting element 20 includes a fluted surface 90 that extends rearward away from the output lens 60. The fluted surface 90 may spread light internally within the first illuminator portion 70 and direct the light outwardly toward the output lens 60. The first illuminator portion 70 also includes a contoured and tilted surface 92 configured to re-direct light from the plurality of first LEDs 50 (not shown on FIG. 5) toward the first region 62 of the output lens 60. The first illuminator portion 70 also defines a plurality of voids 94 on a lower surface thereof to separate fingers 96, with each of the fingers 96 overlying a corresponding one of the first LEDs 50 for focusing and directing light therefrom toward the first region 62 of the output lens 60.

FIG. 5 also shows the light pipe 74 including an elongated body 100 having a generally circular cross-section, with a reflector 102 having a ribbed texture and extending along a side thereof opposite from the input element 72. The reflector 102 may direct light out the opposite side of the elongated body and toward the input element 72 for transmission though the second region 64 of the output lens 60. The elongated body 100 of the light pipe 74 extends between the first illuminator portion 70 and a vertical portion 104 that is configured to receive light from the second LED 51 (not shown on FIG. 5) and to direct the light into the and to direct the elongated body 100 of the light pipe 74. A reflective portion 106 may direct the light within the light pipe 74 through a 90-degree angle from the vertical portion 104 and into the elongated body 100. The reflector 102 may have one or more characteristics, such as a height, that varies along a length of the elongated body to provide a uniform appearance of the illumination along the second region 64 of the output lens 60. The first illuminator portion 70 has a generally flat shape defining a width along the first region 62 of the output lens 60 that is substantially longer than a height of the first illuminator portion 70. The generally flat shape of the first illuminator portion 70 is coplanar with the elongated body 100 of the light pipe 74 and with the output lens 60.

Figure 6:
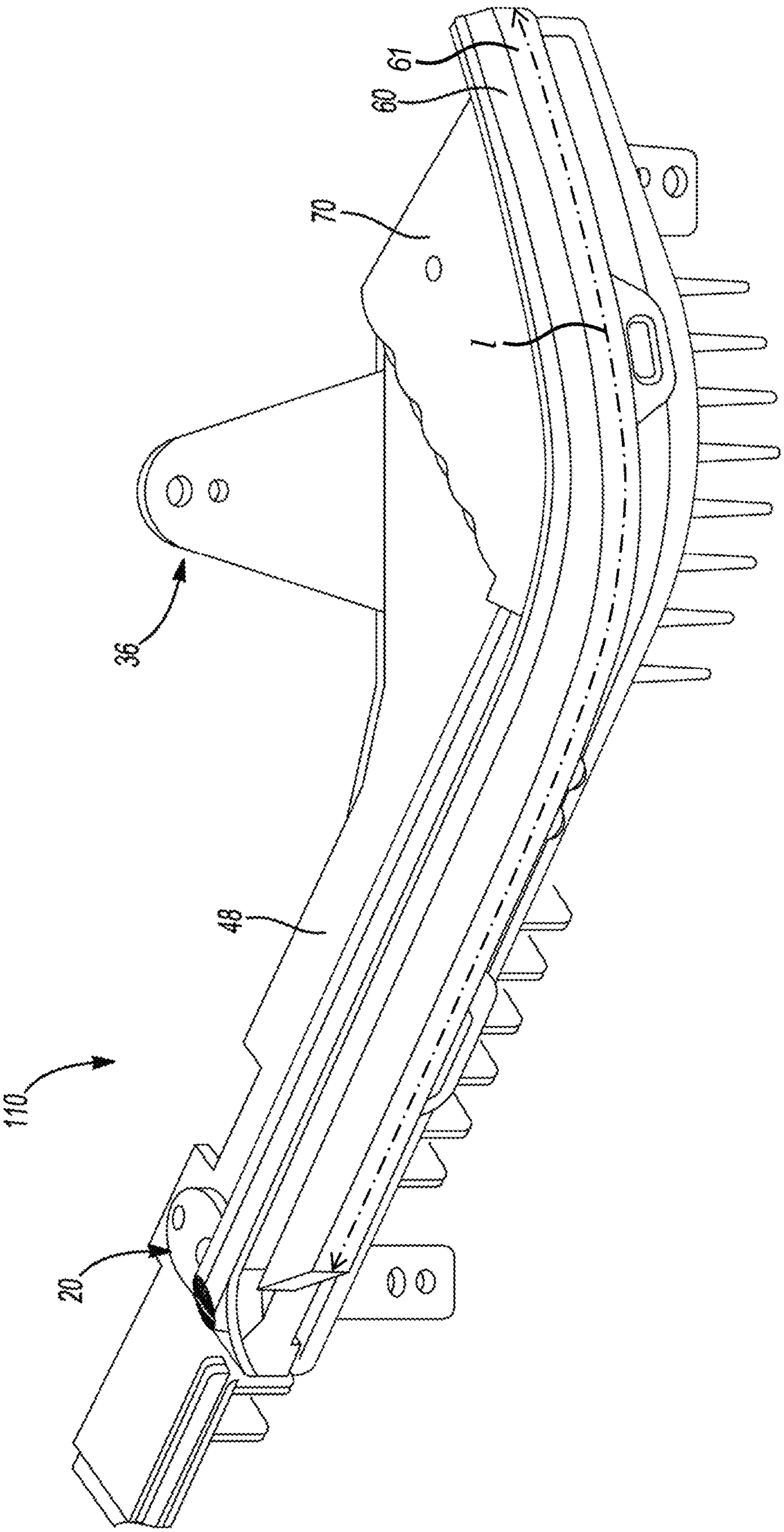
FIG. 6 shows a stop/turn lighting assembly including the stop/turn lighting element of FIG. 3, and with a printed circuit board and a mounting bracket attached thereto.

FIG. 6 shows a stop/turn lighting assembly 110 including the stop/turn lighting element 20, with the printed circuit board 48 and a mounting bracket 36 attached thereto. As shown in FIG. 6, the output lens 60 includes an output surface 61 defining an entire length l and having a constant height along the continuous curvature. In other words, the output surface 61 may define the entire length l along the continuous curvature and a constant height perpendicular thereto. The constant height may be not longer than ten percent (10%) of the entire length l of the output surface 61. The constant height may be not longer than five percent (5%) of the entire length l of the output surface 61. The constant height may be not longer than three percent (3%) of the entire length l of the output surface 61. In some embodiments, and as shown on FIG. 6, the constant height may be about two and a half percent (2.5%) of the entire length l of the output surface 61 along the continuous curvature.

Figure 7:
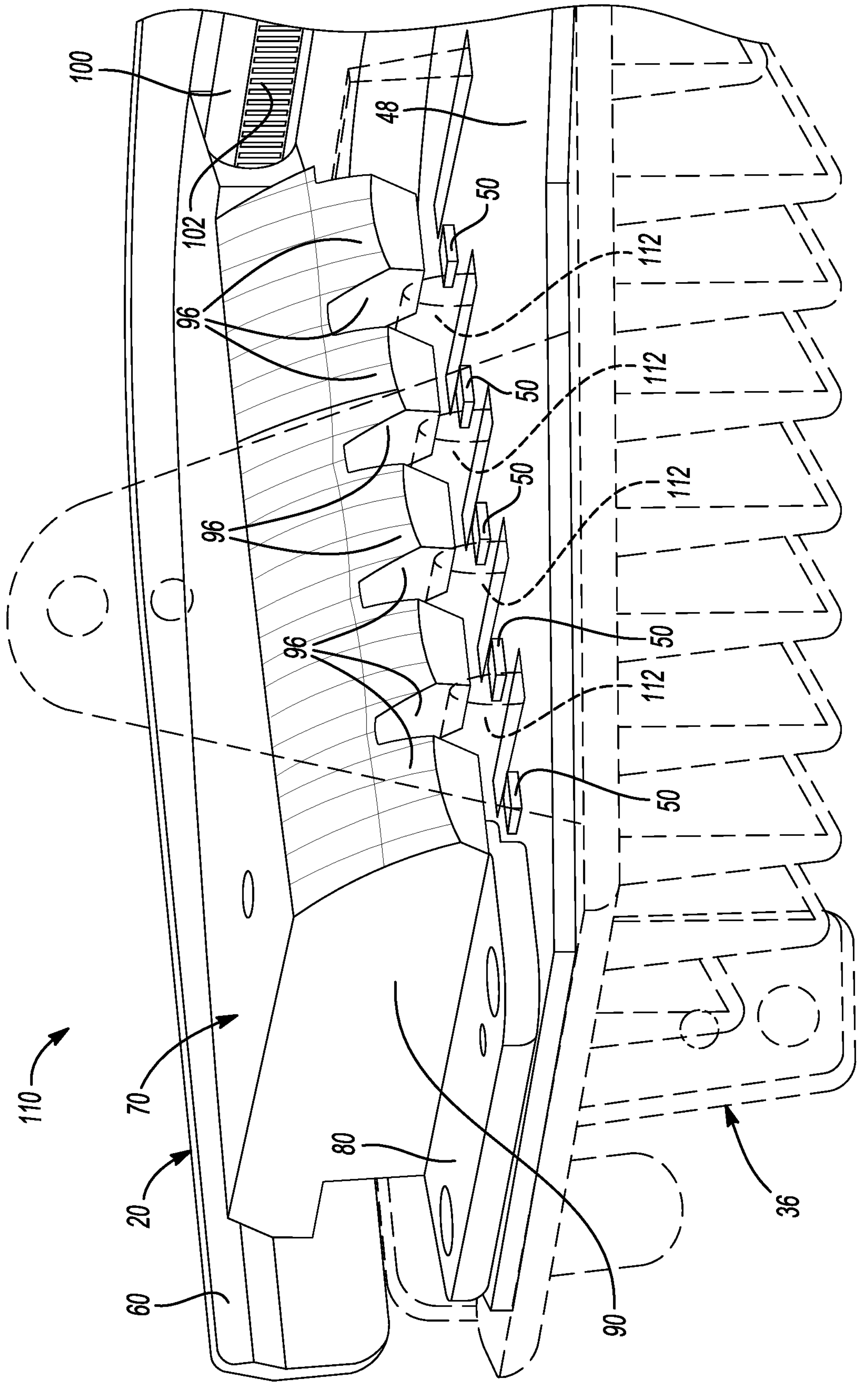
FIG. 7 shows a sectional perspective view of the stop/turn lighting assembly of FIG. 6, with partial-transparency to show internal structures.

FIG. 7 shows a sectional perspective view of the stop/turn lighting assembly 110 of FIG. 6, with partial-transparency to show internal structures. As shown in FIG. 7, the stop/turn lighting assembly 110 includes five of the first LEDs 50 disposed on the PCB 48 and configured to project light upwardly into corresponding fingers 96 of the first illuminator portion 70. In other words, the first LEDs 50 generate light in an upward direction, which is perpendicular to the output lens 60, and with is re-directed by the first illuminator portion 70 for transmission through the first region 62 of the output lens 60. Alternatively, the first LEDs 50 may be located behind and parallel to the output lens 60 for transmission through the first region 62 of the output lens 60. As also shown in FIG. 7, the mounting bracket 36 defines a plurality of fins 112 that extend upwardly through corresponding holes in the PCB 48 and into the voids 94 between the fingers 96 for further directing light from each of the first LEDs 50 into the corresponding one of the fingers 96.

Figure 8:
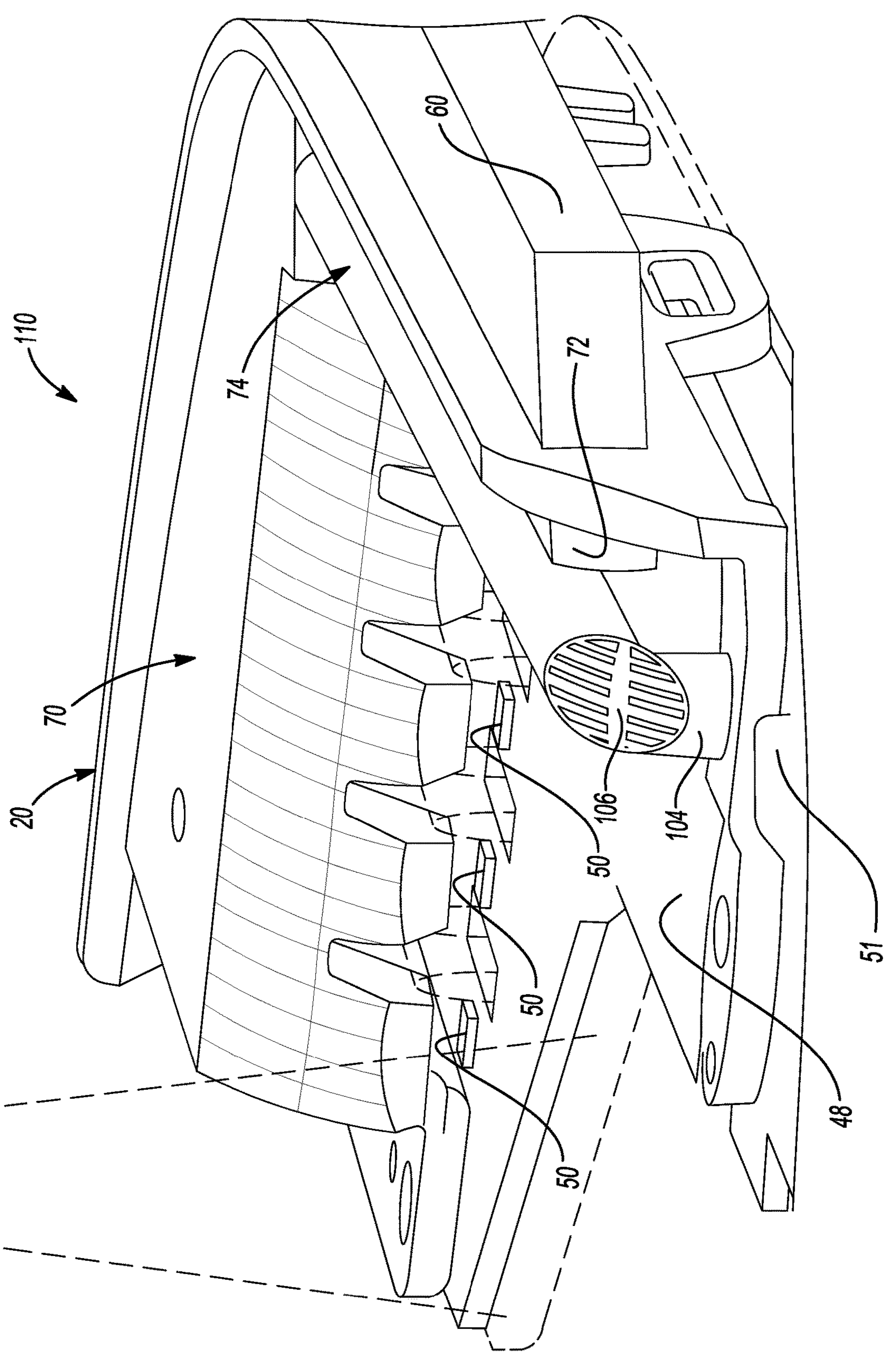
FIG. 8 shows another sectional perspective view of the stop/turn lighting assembly of FIG. 6, with partial-transparency to show internal structures.

FIG. 8 shows sectional perspective view of the stop/turn lighting assembly of FIG. 6, with partial-transparency to show internal structures. FIG. 8 shows the second LED 51 disposed on the PCB 48 directly below the vertical portion 104 of the light pipe 74 for directing light into the light pipe 74. In other words, the second LED 51 generate light in an upward direction, which is perpendicular to the output lens 60, and with is re-directed by the reflective portion 106 and by the light pipe 74 for transmission through the second region 64 of the output lens 60. Alternatively, the second LED 51 may be disposed parallel to (i.e. in-line with) the light pipe 74 and for transmission therethrough and then through the second region 64 of the output lens 60.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lighting assembly for a vehicle, comprising:

an output lens having a first region and a second region having an elongated shape;

a first illuminator portion configured to direct light from a first light source out of the first region of the output lens; and a second illuminator portion including an input element disposed along the second region of the output lens and an elongated light guide having an elongated body extending parallel to and spaced apart from the input element, wherein the second illuminator portion is configured to direct light from a second light source out of the second region of the output lens, wherein the first region and the second region of the output lens define a continuous curvature to provide a continuous illumination around an outside corner of the vehicle, wherein the first illuminator portion has a generally flat shape that is coplanar with the elongated body of the elongated light guide.

2. The lighting assembly of claim 1, wherein the first illuminator portion and the second illuminator portion are formed from a single molded piece.

3. The lighting assembly of claim 1, further including a printed circuit board (PCB), wherein the first light source includes a plurality of first LEDs, and wherein the second light source includes one or more second LEDs, and wherein both of the first LEDs and the second LEDs are disposed on a top surface of the PCB and configured to project light upwardly and substantially perpendicular to the top surface of the PCB.

4. The lighting assembly of claim 3, wherein the one or more second LEDs generate light in a direction perpendicular or parallel to the elongated light guide.

5. The lighting assembly of claim 1, wherein the output lens defines a continuous outer surface including each of the first region and the second region.

6. The lighting assembly of claim 1, wherein the output lens defines an outside corner, with the first region and the second region together wrapping-around at least about a 90-degree angle.

7. The lighting assembly of claim 1, wherein the elongated light guide further includes a reflector extending along a side thereof opposite from the input element.

8. A tail light assembly for a vehicle, comprising:

a light body including an internal plate defining a plurality of apertures;

a plurality of lighting elements each disposed in corresponding apertures of the plurality of apertures, the plurality of lighting elements each configured to illuminate for a corresponding function, the plurality of lighting elements including a stop and turn lighting element; and an outer lens overlying the light body and the plurality of lighting elements, wherein the stop and turn lighting element includes an output lens having a first region and a second region having an elongated shape, wherein the output lens of the stop and turn lighting element has an arcuate shape that protrudes through an aperture of the plurality of apertures of the internal plate, wherein the stop and turn lighting element further includes a first illuminator portion configured to direct light from a first light source out of the first region of the output lens, and a second illuminator portion including an input element disposed along the second region of the output lens and an elongated light guide having an elongated body extending parallel to and spaced apart from the input element, and wherein the second illuminator portion is configured to direct light from a second light source out of the second region of the output lens.

9. The tail light assembly of claim 8, wherein the first illuminator portion and the second illuminator portion are formed from a single molded piece.

10. The tail light assembly of claim 8, further including a printed circuit board (PCB), wherein the first light source includes a plurality of first LEDs, and wherein the second light source includes one or more second LEDs, and wherein both of the first LEDs and the second LEDs are disposed on a top surface of the PCB and configured to project light upwardly and substantially perpendicular to the top surface of the PCB.

11. The tail light assembly of claim 8, wherein the output lens defines a continuous outer surface including each of the first region and the second region.

12. The tail light assembly of claim 8, wherein the output lens defines an outside corner, with the first region and the second region together wrapping-around at least about a 90-degree angle.

13. The tail light assembly of claim 8, wherein the elongated light guide further includes a reflector extending along a side thereof opposite from the input element.

14. The lighting assembly of claim 1, wherein the output lens includes an output surface having a constant height along the continuous curvature, and wherein the constant height is not longer than ten percent (10%) of an entire length of the output surface along the continuous curvature.

15. The lighting assembly of claim 1, wherein the output lens includes an output surface having a constant height along the continuous curvature, and wherein the constant height is not longer than five percent (5%) of an entire length of the output surface along the continuous curvature.

16. The tail light assembly of claim 8, wherein the first illuminator portion has a generally flat shape that is coplanar with the elongated body of the elongated light guide.

17. The tail light assembly of claim 8, wherein the elongated light guide further includes a reflective portion configured to direct the light from the second light source through a 90-degree angle and into an end of the elongated body opposite of the first illuminator portion.

18. The tail light assembly of claim 8, wherein the first region and the second region of the output lens define a continuous curvature to provide a continuous illumination around an outside corner of the vehicle, wherein the output lens includes an output surface having a constant height along the continuous curvature, and wherein the constant height is not longer than ten percent (10%) of an entire length of the output surface along the continuous curvature.

* * * * *